United States Patent [19]
Dick

[11] Patent Number: 5,263,549
[45] Date of Patent: Nov. 23, 1993

[54] MOTORCYCLE SHAFT DRIVE MECHANISM

[76] Inventor: David R. Dick, RR #4, Dunnville, Ontario, Canada, N1A 2W3

[21] Appl. No.: 988,647

[22] Filed: Dec. 7, 1992

[51] Int. Cl.$^5$ .................... B62M 11/10; B62K 17/00
[52] U.S. Cl. .................... 180/226; 180/227
[58] Field of Search ............ 180/219, 221, 226, 227

[56] References Cited

U.S. PATENT DOCUMENTS

| | | |
|---|---|---|
| 561,516 | 6/1896 | Parker . |
| 562,662 | 6/1896 | Richards . |
| 576,158 | 2/1897 | Rub . |
| 604,073 | 5/1898 | McLean . |
| 607,972 | 7/1898 | Vignal . |
| 609,344 | 8/1898 | Harrity . |
| 613,885 | 11/1898 | McDonald . |
| 674,218 | 5/1901 | Robert . |
| 841,434 | 1/1907 | Pequegnat et al. ............ 180/226 |
| 4,520,692 | 6/1985 | Cummins . |
| 4,662,469 | 5/1987 | Matsuda et al. ............... 180/219 |
| 4,662,471 | 5/1987 | Kondo et al. .................. 180/226 |
| 5,067,580 | 11/1991 | Parker ............................. 180/219 |

FOREIGN PATENT DOCUMENTS

| | | | |
|---|---|---|---|
| 762647 | 4/1934 | France ............................ | 180/226 |
| 287452 | 4/1953 | Switzerland .................. | 180/226 |
| 735618 | 8/1955 | United Kingdom .......... | 180/226 |

Primary Examiner—Mitchell J. Hill
Assistant Examiner—C. Mattix
Attorney, Agent, or Firm—Rogers & Scott

[57] ABSTRACT

A motorcycle has a motor mounted on a frame, a drive shaft extending from the motor transversely to the direction of travel, a rear wheel axle and a shaft drive mechanism extending longitudinally from the drive shaft to the rear wheel axle for transmitting power from the drive shaft to the rear wheel axle. The drive mechanism has an elongate housing with a first end portion pivotably mounted about the drive shaft and a second end portion pivotably mounted about the rear wheel axle. A drive gear is located on the drive shaft for rotation thereby, and an axle gear is located on the rear axle for driving the rear axle. A pinion shaft is supported by the housing so as to be rotatable about its own longitudinal axis. The pinion shaft has a front pinion gear meshing with the drive gear and a rear pinion gear meshing with the axle gear so that, when the drive shaft is driven by the motor, the force applied by the drive gear to the front pinion gear creates a first moment on the pinion shaft about the drive shaft which is opposite in direction to a second moment on the pinion shaft about the rear axle which is created by the force of the rear pinion gear driving the axle gear.

23 Claims, 4 Drawing Sheets

MOTORCYCLE SHAFT DRIVE MECHANISM

This invention relates to motorcycles and in particular to a shaft drive mechanism for motorcycles.

Most motorcycles have a motor centrally mounted on a frame for driving the rear wheel of the motorcycle. To provide suspension for the rider, the rear wheel moves up and down angularly on a substantially horizontal swing arm structure which is pivotally mounted to the motorcycle frame. Shock absorbers or springs are located between the swing arm structure and the frame to dampen the up and down motion. A drive mechanism is located between the motor and the rear wheel to transmit power from the motor to the rear wheel.

It is desirable for the drive mechanism to operate in a reliable and quiet manner. A simple drive mechanism will generally have fewer parts, be less expensive to manufacture, and be less prone to breaking down. Of importance to safety and comfort is that the drive mechanism must not interfere with the suspension or the swing arm motion.

There are two types of prior art motorcycle drive mechanisms. The first type is a chain drive where a chain transfers torque from a sprocket wheel on a drive shaft of the motor to a sprocket wheel on the rear wheel axle. The second type is a shaft drive where gears are used to drive a pinion shaft mounted between the drive shaft of the motor and the rear wheel axle. The pinion shaft commonly has a universal joint located concentrically with the pivot point of the swing arm to compensate for the pivoting of the rear wheel on the swing arm. In this type of shaft drive mechanism, the gears at the drive shaft are mounted in a first housing which is fixed to the frame of the motorcycle. The gears used to drive the rear wheel axle are mounted in a second housing which pivots about the axis of the rear wheel axle.

The difficulties with chain drive mechanisms are that they require frequent external lubrication as well as adjustment which can be dirty and time consuming. There is also the risk that the rear wheel can become jammed upon chain failure.

Traditional shaft drive mechanisms inherently solve the aforementioned problems as well as provide a generally quieter ride. The disadvantage with prior art shaft drive mechanisms is that the application of torque to the rear wheel interferes with swing arm movement. This occurs because, as the pinion shaft tries to drive the rear wheel forward, the reactant force rotates the pinion shaft about the axis of the rear wheel axle thereby lifting the motorcycle frame upwards extending its suspension.

The aforementioned lifting effect can be dangerous for the rider. It is felt not only when accelerating from a stopped position but also when accelerating at anytime during the ride. The lifting effect is contrary to what is expected during acceleration and has been known to cause accidents. Another disadvantage caused by the lifting effect is that the spring or shock design must be compromised both in tension and compression. Furthermore, there is a delay in acceleration until the suspension "locks" and the power is transmitted to the rear wheel.

It is an object of this invention to provide a motorcycle with a reliable, quiet and simple shaft drive mechanism that can substantially balance moments created upon transfer of motor power and therefore does not interfere with the suspension and improves the predictability of the ride.

Accordingly, the invention provides a motorcycle having a motor, a frame on which the motor is mounted, a drive shaft extending from the motor transversely to direction of travel, a rear wheel axle and a shaft drive mechanism extending longitudinally from the drive shaft to the rear wheel axle for transmitting power from the drive shaft to the rear wheel axle. The drive mechanism has an elongate housing having a first end portion pivotably mounted on the drive shaft and a second end portion pivotably mounted on the rear wheel axle.

A drive gear is located on the drive shaft for rotation thereby and an axle gear is located on the rear axle for driving the rear axle. A pinion shaft is provided and supported by the housing so as to be rotatable about its longitudinal axis, the pinion shaft having a front pinion gear meshing with the drive gear and a rear pinion gear meshing with the axle gear so that when the drive shaft is driven by the motor, the force applied by the drive gear to the front pinion gear creates a moment on the pinion shaft about the drive shaft which is opposite to a moment on the pinion shaft about the rear axle which is created by the force of the rear pinion gear driving the axle gear Preferably the moments are substantially balanced but they may be unbalanced.

Preferably, said front pinion gear and said rear pinion gear are located longitudinally between the drive shaft and the rear wheel axle, the front pinion gear is located transversely between the motor and the drive gear, and the axle gear is located transversely between the rear wheel and said rear pinion gear.

Alternatively said front pinion gear and said rear pinion gear are located longitudinally between the drive shaft and the rear wheel axle, the drive gear is located transversely between the motor and said front pinion gear, and said rear pinion gear is located transversely between the rear wheel and the axle gear.

In another embodiment said front pinion gear is located longitudinally between the drive shaft and the rear axle, the drive gear is located laterally between the motor and said front pinion gear, said rear pinion gear is located longitudinally behind the rear wheel axle and the axle gear is located laterally between the rear wheel and said rear pinion gear.

In a further embodiment said front pinion gear is located longitudinally ahead of the drive shaft, the drive gear is located laterally between the motor and said front pinion gear, said rear pinion gear is located longitudinally between the drive shaft and the rear wheel axle and the axle gear is located laterally between the rear wheel and said rear pinion gear.

In the preferred embodiment said first end portion of the housing encloses the drive gear and said front pinion gear to hold oil for lubrication therof and said second end portion of the housing encloses the axle gear and said rear pinion gear to hold oil for lubrication thereof. Also the drive gear, the axle gear, said front pinion gear and said rear pinion gear are bevel gears and the drive gear and the axle gear have substantially equal diameters and said front and rear pinion gears have substantially equal diameters.

Alternatively the drive gear could have a diameter smaller than the axle gear so that a resultant moment on the drive mechanism provides sufficient lift on the frame to balance weight transfer due to acceleration forces caused by an increase in motorcycle speed.

The invention will be more fully understood with reference to the following description and drawings in which.

Figure 1:
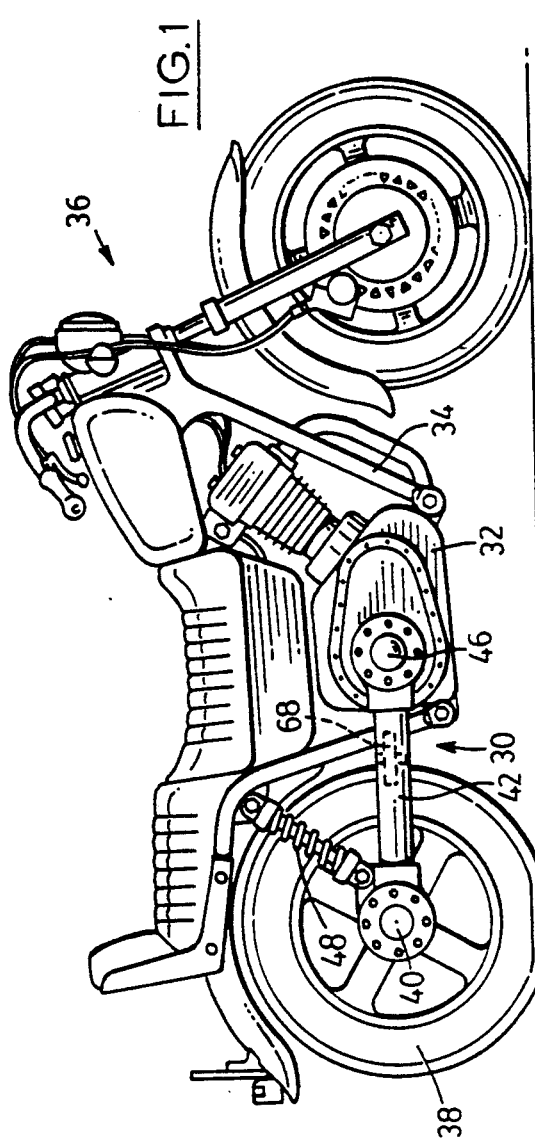
FIG. 1 is a elevational view of a motorcycle showing a shaft drive mechanism in accordance with a preferred embodiment of the invention.

Reference is made to FIG. 1 which illustrates a shaft drive mechanism represented generally by the numeral 30 in accordance with the preferred embodiment of the invention. The shaft drive mechanism 30 is driven by a motor 32 mounted in a frame 34 of a motorcycle 36. Power is transferred from the motor 32 through the shaft drive mechanism 30 to a rear wheel 38. The rear wheel 38 has an axle 40 which is rotatably mounted to a housing 42 and a swing arm 44 (seen in FIG. 3). Both the housing 42 and the swing arm 44 pivot about a drive shaft 46 of the motor 32. Therefore, the rear wheel 38 swings about drive shaft 46 and its motion is damped by shock absorbers 48 thereby providing suspension for the rider.

Figure 2:
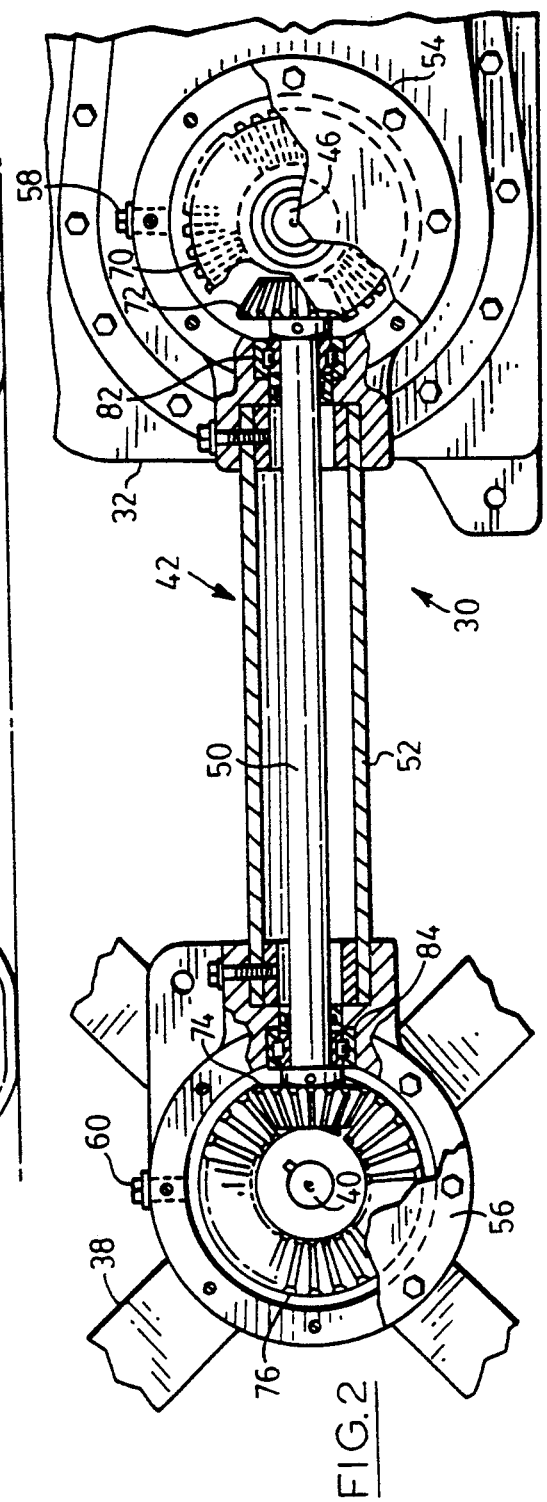
FIG. 2 is a partially cutaway view of the shaft drive mechanism shown in FIG. 1.

FIG. 2 shows a pinion shaft 50 which is used to transfer power from the drive shaft 46 to the rear axle 40 as will be described later with respect to FIG. 3. It can be seen that the housing 42 comprises a pinion shaft housing 52, a drive gear housing 54, and an axle housing 56, all of which form an integral sealed structure. Oil is kept in the housings 54,56 to keep the shaft drive mechanism 30 lubricated and may be filled at ports 58,60 respectively.

Figure 3:
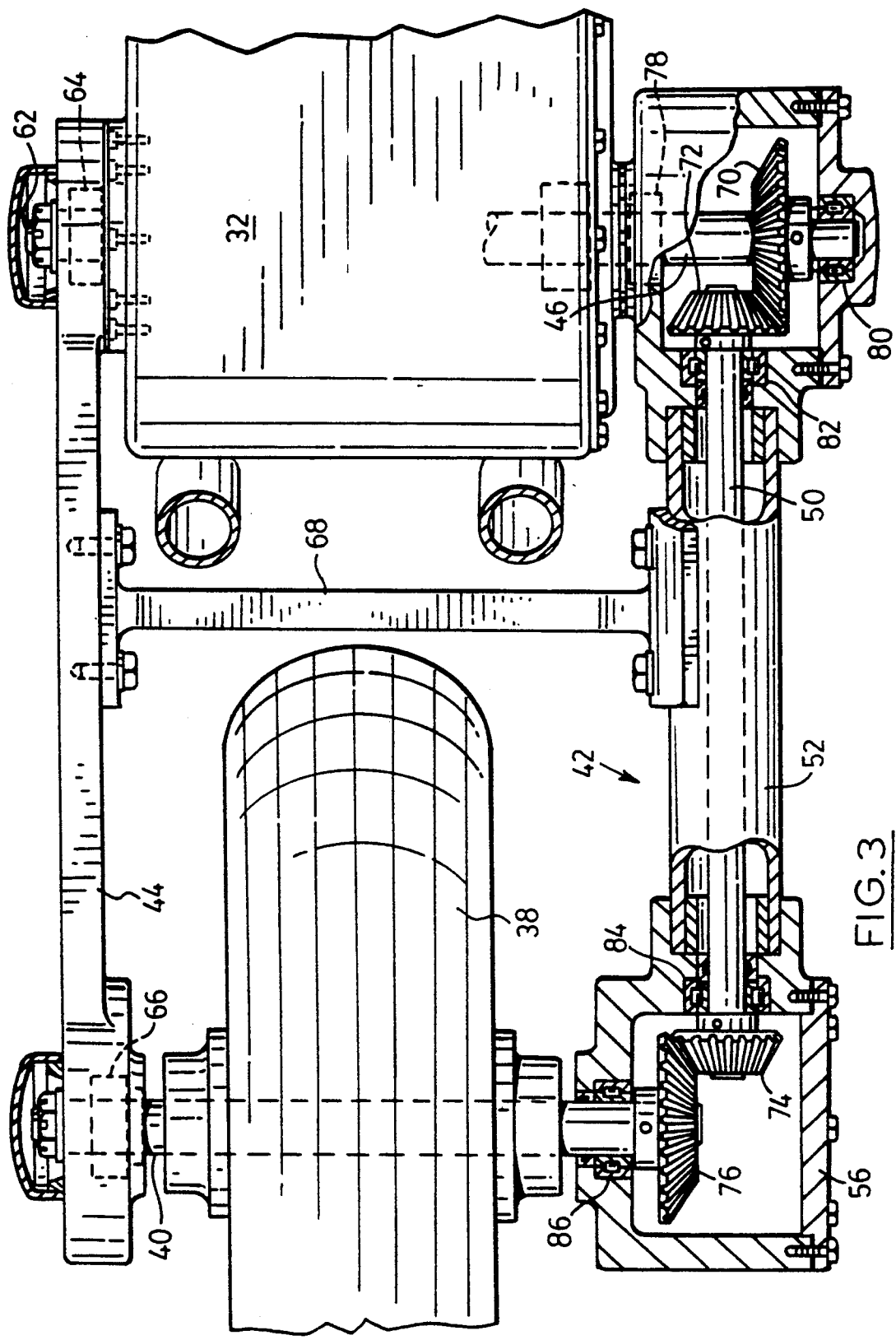
FIG. 3 is a partially cutaway top view of the shaft drive mechanism shown in FIG. 1.

FIG. 3 shows the swing arm 44 pivotably mounted on shaft 62 at bearing 64, the shaft 62 being coaxial with drive shaft 46. The other end of the swing arm 44 is mounted on the rear wheel axle 40 at bearing 66 Cross member 68 joins the swing arm 44 and the housing 42 for support.

In operation, the motor 32 drives drive shaft 46 which in turn rotates a drive gear 70 in a clockwise direction (as shown in FIG. 2). The drive gear 70 is bevelled to mesh with a front pinion gear 72. Thus the pinion shaft 50 is rotated causing a rear pinion gear 74 to turn a meshing bevelled axle gear 76 also in the clockwise direction (as shown in FIG. 2). The axle gear 76 is mounted on the rear wheel axle 40 and therefore the rear wheel 38 is driven in a forward direction.

The drive axle housing 54 is free to pivot in bearings 78 and 80 about the axis of the drive shaft 46. Bearings 82 and 84 support the pinion shaft 50 which rotates about its longitudinal axis. The axle gear housing 56 is free to pivot about the rear axle 40 in bearing 86. Seals are located in conventional positions.

Figure 4:
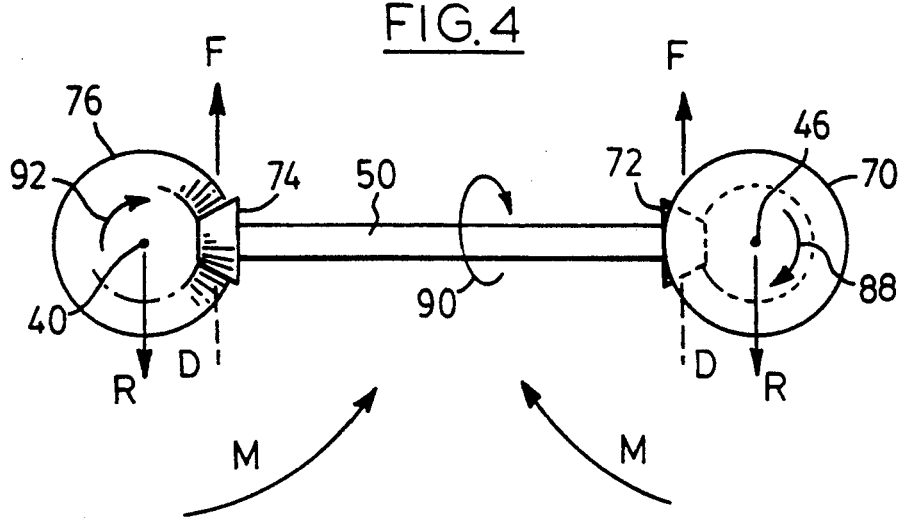
FIG. 4 is a schematic view showing forces acting on the shaft drive mechanism in FIG. 1.

Turning now to FIG. 4, an explanation of the forces involved in the shaft drive mechanism will be given. Drive gear 70 is driven clockwise following arrow 88. This in turn tends to lift front pinion gear 72 with a force F. The force F turns the pinion shaft 50 with a moment represented by arrow 90. The moment 90 on the pinion shaft 50 turns the rear pinion gear 74 which drives the axle gear 76 in the direction of arrow 92 thereby exerting a force, equivalent to force F, downwards on the axle gear 76 at the rear pinion gear 74. This results in an upward force F on the pinion shaft 50. Therefore a force F acts upwards on the pinion shaft 50 at both the front pinion gear 72 and the rear pinion gear 74. If the distances from gears 70,76 to gears 72,74 respectively are equal, such as distances D in FIG. 4, then resultant moments labelled M are equal and opposite and will cancel one another out. This means there is no tendency for the housing 42 to rotate about either the drive shaft 46 or the rear axle 40. Reaction forces R act downwards at both the rear axle 40 and the drive shaft 46 to counterbalance the forces F. These are transferred to the housing 42 to be resolved to balance in the vertical direction and are of no concern to the suspension.

Figure 5:
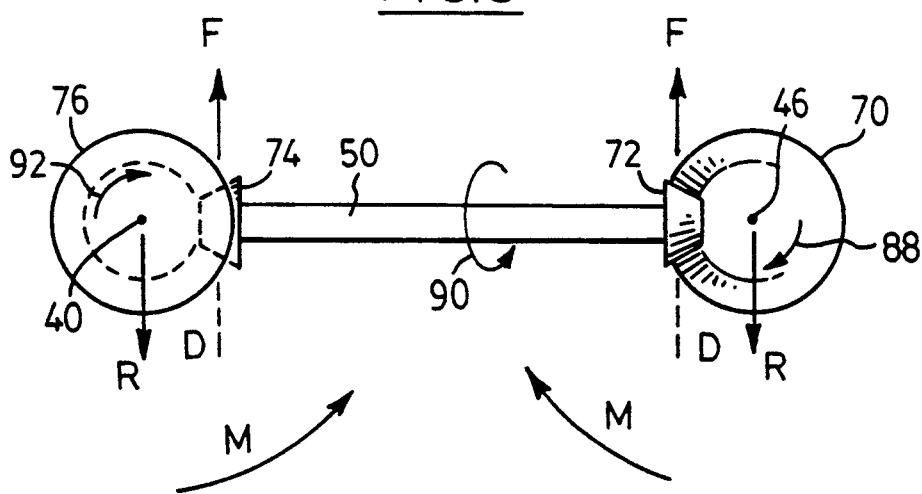
FIG. 5 is similar to FIG. 4 but showing an alternative embodiment.
Figure 6:
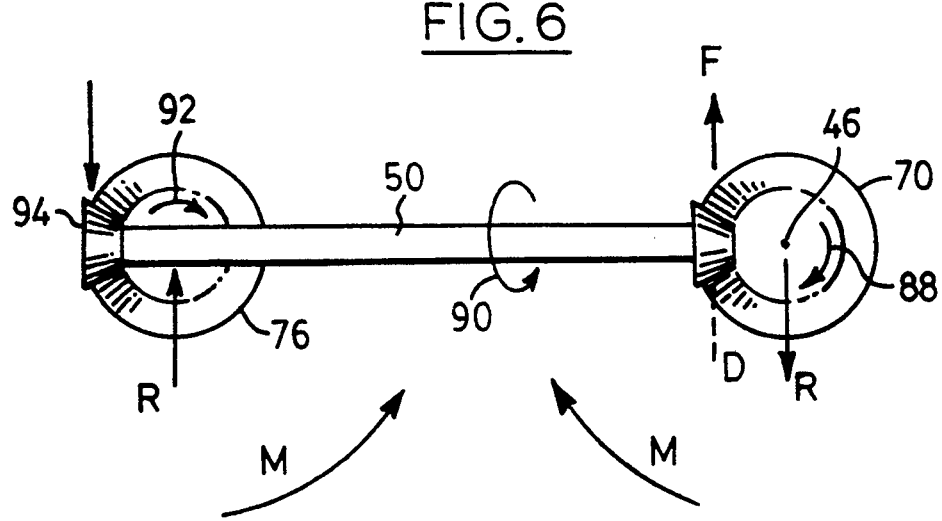
FIG. 6 is similar to FIG. 4 but showing a further alternative embodiment.
Figure 7:
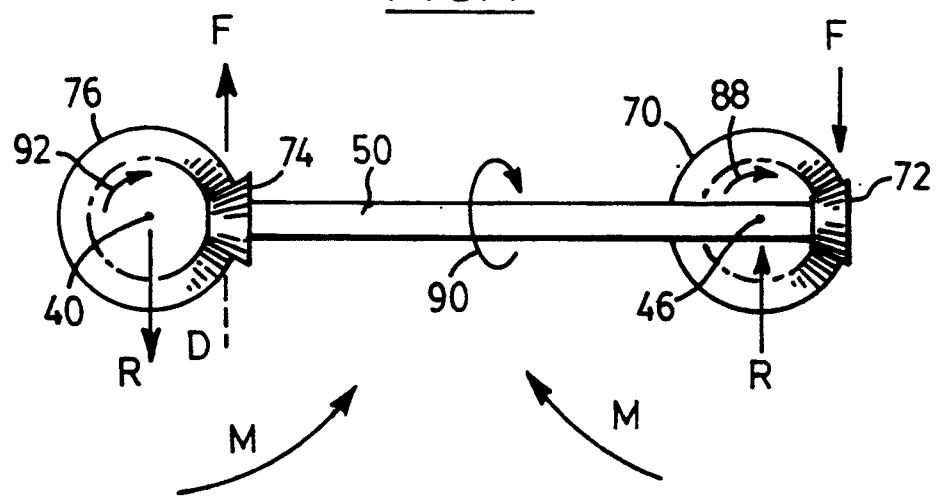
FIG. 7 is similar to FIG. 4 but showing a further alternative embodiment.

FIGS. 5, 6 and 7, show three alternative embodiments to accomplish the balancing of the moments, thereby providing a resultant moment of zero about the drive shaft 46 and the rear axle 40. The embodiment shown in FIG. 5 has the bevel of the drive gear 70 facing away from the motor 32 (not shown). The bevel of the axle gear 76 faces towards the rear wheel 38 (not shown). The drive gear 70 is moved to a location between the motor 32 and the front pinion gear 72 and the axle gear 76 is moved so that the rear pinion gear 74 is between the axle gear 76 and the rear wheel 38.

Another embodiment is shown in FIG. 6 where a rear pinion gear 94 has a bevel facing in the same direction as the bevel of the front pinion gear 72 and located on the rear part of the axle gear 76 (left side as drawn) with the axle gear 76 between the rear wheel 38 and the rear pinion gear 94. The forces exerted at the pinion gears 72 and 74 act in opposite directions, but the moments M still cancel each other. In this embodiment, the pinion shaft 50 would probably be further supported behind the rear pinion gear 94.

A similar embodiment is shown in FIG. 7 where the front pinion gear 72 is located on the outer front part of the drive gear 70 with the bevel of the gear 72 facing the same way as the bevel of the rear pinion gear 74 which is located on the outer front part of the axle gear 76.

Other embodiments with various gear arrangements will be apparent to a person skilled in the art. It should be noted that if the drive gear 70 shown in FIG. 3 is simply relocated between the front pinion gear 72 and the motor 32 with the bevel facing away from the motor 32, the moments about the drive shaft 46 and the rear axle 40 would be compounded and lift the motorcycle frame upwards on its suspension. Similarily, if the rear pinion gear 74 were between the rear wheel 38 and the axle gear 76, the application of power from the engine would lift the motorcycle frame upwards on its suspension. Both of these reactions would be extreme with the moments compounded and are undesirable and should be avoided.

It may be desirable, however, to provide opposing unbalanced resultant moments by varing the size of the drive gear 70 or the axle gear 76 as used in the described embodiments. By doing this, one of the distances D in FIG. 4 is varied and therefore the moments M will act against one another but not neutralize. Of course the revolutions per minute of the drive shaft 46 will not be the same as the revolutions per minute of the rear axle 40. An added lift on the motorcycle frame 34 may be desirable to counterbalance the weight transfer on the frame due to the acceleration forces which would cause the shock absorbers 48 to compress. Added lift can be accomplished by making the drive gear 70 smaller than the axle gear 76 in the preferred embodiment shown in FIG. 3. A preferred range would be from about twice as small to about 4 times as small. The ratio of revolutions per minute of the motor 32 to the rear axle 40 must then be increased to a ratio of about 2:1 to about 4:1 to keep the revolutions per minute of the rear wheel 38 the same as when the size of the gears 70,76 were equal. Opposing and unbalanced moments can also be created by altering the size of one of the pinion gears 72 or 74. To add lift on the motorcycle frame 34, the front pinion gear can be made larger, again so that the ratio of motor speed to axle speed is about 2:1 to about 4:1.

Although the preferred embodiment is shown as having a swing arm 44 mounted parallel to the shaft drive mechanism housing 42, it is possible to eliminate the swing arm 44 and provide a cross support member pivotable at shaft 62 and joining the housing 42 at approximately the same place as cross member 68. This means that the housing 42 is the only support extending to the rear axle. This and other structures are within the scope of the invention defined in the following claims.

I claim:

1. A motorcycle having a motor, a frame on which the motor is mounted, a drive shaft extending from the motor transversely to direction of travel, a rear wheel axle and a shaft drive mechanism extending longitudinally from the drive shaft to the rear wheel axle for transmitting power from the drive shaft to the rear wheel axle, the drive mechanism comprising:
an elongate housing having a first end portion pivotably mounted about the drive shaft and a second end portion pivotably mounted about the rear wheel axle;
a drive gear located on the drive shaft for rotation thereby;
an axle gear located on the rear axle for driving the rear axle;
a pinion shaft supported by the housing so as to be rotatable about its own longitudinal axis, the pinion shaft having a front pinion gear meshing with the drive gear and a rear pinion gear meshing with the axle gear so that when the drive shaft is driven by the motor, the force applied by the drive gear to the front pinion gear creates a first moment on the pinion shaft about the drive shaft which is opposite in direction to a second moment on the pinion shaft about the rear axle which is created by the force of the rear pinion gear driving the axle gear.

2. A motorcycle as claimed in claim 1 wherein said first moment and said second moment are substantially balanced.

3. A motorcycle as claimed in claim 2 wherein said front pinion gear and said rear pinion gear are located longitudinally between the drive shaft and the rear wheel axle, the front pinion gear is located transversely between the motor and the drive gear, and the axle gear is located transversely between the rear wheel and said rear pinion gear.

4. A motorcycle as claimed in claim 2 wherein said front pinion gear and said rear pinion gear are located longitudinally between the drive shaft and the rear wheel axle, the drive gear is located transversely between the motor and said front pinion gear, and said rear pinion gear is located transversely between the rear wheel and the axle gear.

5. A motorcycle as claimed in claim 2 wherein said front pinion gear is located longitudinally between the drive shaft and the rear axle, the drive gear is located laterally between the motor and said front pinion gear, said rear pinion gear is located longitudinally behind the rear wheel axle and the axle gear is located laterally between the rear wheel and said rear pinion gear.

6. A motorcycle as claimed in claim 2 wherein said front pinion gear is located longitudinally ahead of the drive shaft, the drive gear is located laterally between the motor and said front pinion gear, said rear pinion gear is located longitudinally between the drive shaft and the rear wheel axle and the axle gear is located laterally between the rear wheel and said rear pinion gear.

7. A motorcycle as claimed in claim 2 wherein said first end portion of the housing encloses the drive gear and said front pinion gear to hold oil for lubrication therof and said second end portion of the housing encloses the axle gear and said rear pinion gear to hold oil for lubrication thereof.

8. A motorcycle as claimed in claim 2 wherein the drive gear, the axle gear, said front pinion gear and said rear pinion gear are bevel gears.

9. A motorcycle as claimed in claim 2 wherein the drive gear and the axle gear have substantially equal diameters.

10. A motorcycle as claimed in claim 2 wherein said front and rear pinion gears have substantially equal diameters.

11. A motorcycle as claimed in claim 1 wherein said first moment is smaller than said second moment and provides sufficient lift on the frame to balance weight transfer due to acceleration forces caused by an increase in motorcycle speed.

12. A motorcycle as claimed in claim 11 wherein the drive gear has a diameter smaller than that of the axle gear.

13. A motorcycle as claimed in claim 12 wherein the ratio of said diameter of the drive gear to said diameter of the axle gear is in the range of from about 1:2 to about 1:4.

14. A motorcycle as claimed in claim 11 wherein said front pinion gear has a diameter larger than that of said rear pinion gear.

15. A motorcycle as claimed in claim 14 wherein the ratio of said diameter of said front pinion gear to said diameter of said rear pinion gear is in the range of about 2:1 to about 4:1.

16. A motorcycle as claimed in claim 11 wherein said front pinion gear and said rear pinion gear are located longitudinally between the drive shaft and the rear wheel axle, the front pinion gear is located transversely between the motor and the drive gear, and the axle gear is located transversely between the rear wheel and said rear pinion gear.

17. A motorcycle as claimed in claim 11 wherein said front pinion gear and said rear pinion gear are located longitudinally between the drive shaft and the rear wheel axle, the drive gear is located transversely between the motor and said front pinion gear, and said rear pinion gear is located tranversely between the rear wheel and the axle gear.

18. A motorcycle as claimed in claim 11 wherein said front pinion gear is located longitudinally between the drive shaft and the rear axle, the drive gear is located laterally between the motor and said front pinion gear, said rear pinion gear is located longitudinally behind the rear wheel axle and the axle gear is located laterally between the rear wheel and said rear pinion gear.

19. A motorcycle as claimed in claim 11 wherein said front pinion gear is located longitudinally ahead of the drive shaft, the drive gear is located laterally between the motor and said front pinion gear, said rear pinion gear is located longitudinally between the drive shaft and the rear wheel axle and the axle gear is located laterally between the rear wheel and said rear pinion gear.

20. A motorcycle as claimed in claim 11 wherein said first end portion of the housing encloses the drive gear and said front pinion gear to hold oil for lubrication therof and said second end portion of the housing encloses the axle gear and said rear pinion gear to hold oil for lubrication thereof.

21. A motorcycle as claimed in claim 11 wherein the drive gear, the axle gear, said front pinion gear and said rear pinion gear are bevel gears.

22. A motorcycle as claimed in claim 11 wherein the drive gear and the axle gear have substantially equal diameters.

23. A motorcycle as claimed in claim 11 wherein said front and rear pinion gears have substantially equal diameters.

* * * * *